(12) United States Patent
Pechenick et al.

(10) Patent No.: US 7,595,740 B2
(45) Date of Patent: Sep. 29, 2009

(54) REAL TIME NAVIGATION AND ADVERTISING PLATFORM FOR PUBLIC TRANSPORTATION

(75) Inventors: Pini Pechenick, Tel Aviv (IL); Tomer Yosef Morad, Tel Aviv (IL); Tomer Chen, Raanana (IL)

(73) Assignee: Transspot Ltd., Raanana (IL)

( * ) Notice: Subject to any disclaimer, the term of this patent is extended or adjusted under 35 U.S.C. 154(b) by 207 days.

(21) Appl. No.: 11/163,671

(22) Filed: Oct. 26, 2005

(65) Prior Publication Data
US 2007/0152850 A1    Jul. 5, 2007

(51) Int. Cl.
*G08G 1/123* (2006.01)
(52) U.S. Cl. ............ 340/988; 340/990; 340/994; 340/995.1; 340/531; 340/539.1; 340/539.11; 340/539.13; 235/380; 235/383; 700/200; 700/204
(58) Field of Classification Search .......... 340/988, 340/905, 990, 995.1, 995.13, 539.1, 539.13, 340/531, 5.64, 539.11, 994; 235/380, 383; 701/200, 204; 725/75, 76
See application file for complete search history.

(56) References Cited

U.S. PATENT DOCUMENTS

| | | | | |
|---|---|---|---|---|
| 6,006,159 | A * | 12/1999 | Schmier et al. ............ 701/200 |
| 6,236,330 | B1 * | 5/2001 | Cohen ................... 340/691.6 |
| 6,888,443 | B2 * | 5/2005 | Ritter ..................... 340/5.64 |
| 6,919,804 | B1 * | 7/2005 | Cook et al. ............... 340/541 |
| 6,951,359 | B2 * | 10/2005 | Swift ........................ 296/64 |

* cited by examiner

*Primary Examiner*—Hung T. Nguyen
(74) *Attorney, Agent, or Firm*—Robert G. Lev

(57) ABSTRACT

Invention is provided for navigation and orientation for all types of passengers traveling in public transportation. Segmentation methods for digital advertising based on location and number of passengers. Method for delivering audio and visual advertisements in real time into public transportation vehicles. Method for delivering public transportation positioning information, including arrival times, remaining times, past and future stops, stop numbers, current position, street and neighborhood names, waypoints, connections with other public transportation means, and news headlines. Method for embedding advertisements in any form, including banners, skins, pop-ups, video, audio, text and animation, in information screens inside public transportation.

17 Claims, 1 Drawing Sheet

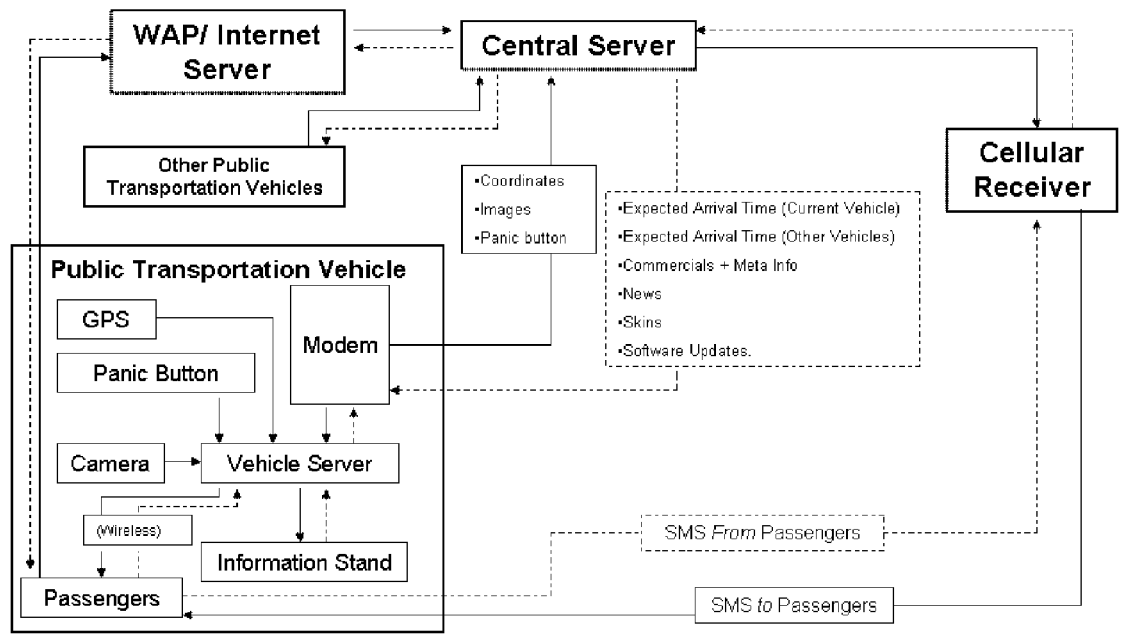

REAL TIME NAVIGATION AND ADVERTISING PLATFORM FOR PUBLIC TRANSPORTATION

FIELD OF THE INVENTION

This invention relates generally to GPS usage in public transportation in order to enrich passengers' experience and make traveling and navigating more convenient. More particularly, the present invention relates to supplying relevant information regarding the current and connecting rides or flights in public transportation, as well as advertising, commercial and non-commercial information.

SUMMARY OF THE INVENTION

This invention relates to supplying relevant position-based information to passengers who use public transportation vehicles. This information includes the current location; estimated arrival times of the current vehicle; traffic jam information; estimated arrival times of connecting vehicles; news broadcasts; position and non-position based commercials; and interactive and non-interactive content. In addition, an architecture based on this invention will include a position-based panic button.

Passengers will receive this information by various means, including video/audio displays inside public transportation vehicles, internet, wireless communication to personal mobile devices, and an information stand.

The advertising information provided will be position based on real-time GPS information. Advertisers will thus have more accurate segmentation abilities.

It is an object of the invention to supply all needed information regarding rides/flights arrival times, possible connections with outer means of transportation, current course, future and past stops, traffic information, alternatives, course related orientation and other related information. The needed information will be provided using hardware and software which are located inside and outside the public transportation vehicles.

Another object of the invention is to open a new medium for potential advertisers who want to reach specific audiences. By using innovative and advanced methods of segmentation which include the usage of real time information and updated statistics, advertisers can acquire real time results and gain maximum return for their investments.

Relevant advertisement and commercial information will be displayed in public transportation vehicles according to different segmentations that were made. In addition, interactive information (commercial and non-commercial) will be displayed and used by passengers through any kind of wireless protocol (SMS, MMS, Bluetooth, WiFi, etc.). This interactive information can then be used by passengers outside the perimeter of the public transportation vehicles.

These and other goals and objects of the present invention are achieved by a process of advertising. This process includes determining location information of a plurality of public transportation vehicles in real time. Arrival times of the vehicles are estimated and real time information on the passengers inside of the vehicle is acquired. Advertisements are then selected responsive to the acquired real time information regarding the passengers inside one of the vehicles. The arrival time is displayed along with selected advertisements within one of the vehicles.

BRIEF DESCRIPTION OF DRAWINGS

FIG. 1 illustrates a possible system architecture of the invention.

DETAILED DESCRIPTION OF THE INVENTION

FIG. 1 illustrates components of an exemplary public transportation information system. Each public transportation vehicle is equipped with a global positioning system, a processing server, a wireless modem and optionally an information stand and a video camera. Global positioning information is passed from the GPS to the vehicle server for processing. The information is also transmitted via the wireless modem to a central server.

The central server receives the positioning information from all the public transportation vehicles. This information is used to calculate the estimated arrival times of each vehicle to its upcoming stops. The calculation may take into account recent measured travel durations and traffic information from an external or internal source. This information is in turn sent back to the servers in the public transportation vehicles.

Upon receiving the estimated arrival times, the vehicle servers provide this information to the passengers. The information may be displayed on screens, heard, or transmitted to wireless personal mobile devices. In case of a communication problem, the servers inside the vehicles will have the ability to estimate the arrival times, based on partial information.

The information displayed on the vehicle screens will include past and upcoming stops; maps; the estimated arrival times of the upcoming stops; all possible connections in the upcoming stops and their arrival times; remaining times; new broadcasts; commercial information; non-commercial information; and weather forecasts. All information will be position based, including the commercial information. The displayed information will be multi-lingual.

The information heard inside the vehicles will include the upcoming stops and their arrival times, commercial and non-commercial information, and urgent news broadcast.

The information transmitted to wireless personal mobile devices will include the upcoming stops; their arrival and remaining times; personal alerts based on positioning information; and commercial and non-commercial information.

Advertisements will be stored on the vehicle servers and will be updated on a regular basis from the central server. Additionally, advertisements may be streamed in real-time from the central server.

Image information may be transmitted from the vehicles to the central server for statistic gathering, security or any other purpose.

The panic button will be used by the authorized personnel in case of emergency. Using the positioning information, the urgent situation and its location could be later reported to the relevant authorities.

The vehicle can include an interactive information stand, in which all the above mentioned information will be displayed. In addition, the passengers will be able to purchase various products and gain easier access to relevant information.

The positioning information from the central server will be transferred to electronic stationary billboards located on buildings or anywhere outside the public transportation vehicles, in order to display advertisements segmented for the passing vehicles or people. Additionally, external billboards located on the vehicles will be able to display advertisements segmented to specific locations.

Software and firmware updates to the vehicle server will be performed remotely from the central server, or by locally using removable media.

Passengers will be able to communicate with the central server and the vehicle servers by wireless short range protocols, as well as long range wireless and cellular protocols. A cellular message gateway will enable two-way communications between the passengers and the central and vehicle servers.

The information mentioned above will be available through an internet gateway. Passengers will be able to check estimated arrival times even before boarding the public transportation vehicles.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of advertisement, comprising:
   determining location information on a plurality of public transportation vehicles in real time;
   estimating arrival times of the vehicles;
   acquiring real time information on the passengers inside one of the vehicles;
   selecting advertisements responsive to the acquired real time information on the passengers inside one of the vehicles; and
   displaying the estimated arrival times along with the selected advertisements within the one of the vehicles.

2. A method according to claim 1, wherein determining the location information comprises determining based on GPS readings from within the vehicles.

3. A method according to claim 1, wherein acquiring the real time information comprises acquiring images from within one of the vehicles.

4. A method according to claim 1, wherein displaying the estimated arrival times comprises displaying on wireless personal mobile devices.

5. A method according to claim 4, wherein estimating the arrival times and selecting the advertisements are performed in a first unit and the data to be displayed is transmitted to the wireless personal mobile devices using a short range wireless protocol.

6. A method according to claim 5, wherein the data to be displayed is transmitted to the mobile devices using the Bluetooth protocol.

7. A method according to claim 1, comprising displaying weather information along with the estimated arrival times.

8. A method according to claim 1, wherein selecting the advertisements comprises selecting at least partially responsive to the number of passengers in the vehicle.

9. A method according to claim 1, wherein selecting the advertisements comprises selecting responsive to biddings placed by advertisers.

10. A method according to claim 1, comprising providing personal alerts to passengers on the vehicle based on the determined location information.

11. A method according to claim 10, wherein providing the personal alerts comprises providing alerts in an SMS message.

12. A method according to claim 10, wherein providing the personal alerts comprises providing using a short range wireless protocol.

13. An advertisement aiding system, comprising:
    a plurality of location determination units adapted for mounting on public transport vehicles;
    apparatus for acquiring real time information on the passengers inside one of the vehicles;
    a display adapted to display advertisements within the one of the vehicles;
    a first processor adapted to estimate arrival times of the vehicles responsive to information from the location determination units;
    a second processor adapted to select advertisements responsive to real time information on the passengers acquired by the apparatus for acquiring real time information; and
    a display controller adapted to present estimated arrival times from the first processor along with advertisements selected by the second processor, on the display.

14. An advertisement aiding system according to claim 13, wherein the second processor is configured to determine the cost of advertising on the vehicle responsive to real time data on the number of passengers on the vehicle.

15. An advertisement aiding system according to claim 13, wherein the second processor is configured to receive a budget and to allow advertisers to select advertisement opportunities responsive to the budget and the determined costs.

16. An advertisement aiding system according to claim 13, wherein the second processor is configured to manage a bidding system for selecting the advertisements for specific times.

17. An advertisement aiding system according to claim 13, wherein the apparatus for acquiring real time information on the passengers comprises a camera.

* * * * *